United States Patent
Nishikawa (10) Patent No.: US 6,373,578 B1
(45) Date of Patent: Apr. 16, 2002

(54) LENS INSPECTION SYSTEM

(75) Inventor: Hiroshi Nishikawa, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/525,133

(22) Filed: Mar. 14, 2000

(30) Foreign Application Priority Data

Mar. 19, 1999 (JP) ............................................. 11-075030

(51) Int. Cl.⁷ ................................................ G01B 9/02
(52) U.S. Cl. ....................................... 356/515; 356/520
(58) Field of Search ................................. 356/512, 515, 356/520; 369/112.23

(56) References Cited

U.S. PATENT DOCUMENTS

| | | | | |
|---|---|---|---|---|
| 4,743,118 A | * | 5/1988 | Tsuchiya et al. | 356/520 |
| 5,553,052 A | * | 9/1996 | Oono et al. | 369/112.23 |
| 5,793,735 A | * | 8/1998 | Oono | 369/112.2 |
| 5,917,599 A | | 6/1999 | Nishikawa et al. | 356/510 |

* cited by examiner

*Primary Examiner*—Samuel A. Turner
(74) *Attorney, Agent, or Firm*—Greenblum & Bernstein, P.L.C.

(57) ABSTRACT

A lens inspection system for evaluating an objective lens system of an optical data recording/reproducing device by measuring a wave front of a light beam emerged from the objective lens system is provided with a laser source and a conversion lens. A laser beam is emitted by the laser source, and is incident on the objective optical system of the optical data recording/reproducing device. Further provided is an interferometer for measuring the wave front. A numerical aperture of an objective lens of the interferometer is smaller than a numerical aperture of the objective lens system of the optical data recording/reproducing device. The conversion lens receives the light beam emerged from the objective lens system of the optical data recording/reproducing device and emerges a light beam to the objective lens of the interferometer such that all the light beam emerged from the conversion lens enters the objective lens of the interferometer.

20 Claims, 6 Drawing Sheets

LENS INSPECTION SYSTEM

BACKGROUND OF THE INVENTION

The present invention relates to a lens inspection system for inspecting a lens used for an optical disc drive or the like for measuring and examining a wave front of a light beam emitted by the lens.

In an optical data recording/reproducing device using an optical disc, if an objective lens is damaged and/or the objective lens is not in place with respect to the data recording surface of the optical disc, coma, astigmatism or some other wave front aberrations may occur. In such a situation, a beam spot on the optical disc may not be sufficiently small on the data recording surface of the optical disc, which prevents recording/reproducing of data at high density on the optical disc. Therefore, when the optical disc is manufactured, the wave front of the light emerged from the objective lens is measured using an interferometer in order to examine a performance of such a device.

Recently, in order to increase the recording density of the optical disc, optical data recording/reproducing technology using a high-NA (numerical aperture) objective lens has been developed. In order to measure the entire wave front of light emerged from such a high-NA objective lens, the interferometer should also be provided with an objective lens whose NA is higher than the NA of the objective lens of the optical disc drive.

However, the high-NA objective lens of the interferometer is required to have a very high surface accuracy, and the wave front aberration of such a lens should be suppressed within a predetermined allowable level. Such a lens is very difficult to manufacture, and would be relatively expensive. Further to the above, a precise structure of the interferometer is required in accordance with the accuracy of the high-NA objective lens.

SUMMARY OF THE INVENTION

It is therefore an object of the invention to provide an improved lens inspection system capable of measuring a wave front of light emerged from a high-NA lens of an optical disc drive without using a high-NA objective lens for the interferometer.

For the above object, according to the invention, there is provided a lens inspection system for evaluating an objective optical system of an optical data recording/reproducing device by measuring a wave front of a light beam emerged from the objective optical system, provided with:

a laser source, a laser beam emitted by the laser source being incident on the objective optical system of the optical data recording/reproducing device;

an interferometer for measuring the wave front, a numerical aperture of an objective lens of the interferometer being smaller than a numerical aperture of the objective optical system of the optical data recording/reproducing device; and a conversion lens which receives the light beam emerged from the objective optical system of the optical data recording/reproducing device and emerges a light beam to the objective lens of the interferometer such that all the light beam emerged from the conversion lens enters the objective lens of the interferometer.

As above, by the conversion lens, all the light emerged from the objective optical system of the optical data recording/reproducing device can be received by the interferometer even though the numerical aperture of the objective lens of the interferometer is relatively small.

Optionally, the conversion lens may have a first surface including a spherical surface, and a second surface that is a flat surface perpendicular to a central axis of the light beam emerged from the objective optical system of the optical data recording/reproducing device. The conversion lens may be arranged such that the first surface faces the objective lens of the interferometer, and the second surface faces the objective optical system of the optical data recording/reproducing device, with the central axis of the light beam passing a spherical center of the first surface.

Optionally, a parallel plate is inserted between the objective optical system of the optical data recording/reproducing device and the conversion lens. Preferably, the parallel plate has a thickness and refractive index that are similar to those of a transparent base plate of an optical disc. The parallel plate enables a precise measurement of the wave front.

In this case, the conversion lens and the parallel plate may be apart from each other.

In particular, the parallel plate may be a dummy disc that is mounted on a spindle of a data recording/reproducing device.

Optionally, the second surface of the conversion lens may be located at a level where the data recording surface of the optical disc is located when data is recorded/reproduced, and at least a portion of the dummy disc facing the conversion lens is shifted toward the objective optical system side.

Alternatively, the conversion lens contacts the parallel plate. In this case, the conversion lens and the parallel plate could be integrally formed.

Further optionally, the conversion lens is made contact with a surface of the objective optical system of the optical data recording/reproducing device. In this case, a numerical aperture of the objective optical system of the optical data recording/reproducing device could be greater than one.

Still optionally, the conversion lens may be a hemispherical lens. In this case, a point where the light beam emerged from the objective optical system of the optical data recording/reproducing system may converge substantially coincides with the spherical center of the hemispherical lens.

According to another aspect of the invention, there is provided a lens inspection system for measuring a wave front of a light beam emerged by an objective optical system of an optical data recording/reproducing device, which is provided with:

an interferometer for measuring the wave front, a numerical aperture of an objective optical system of the interferometer being smaller than a numerical aperture of the objective optical system of the optical data recording/reproducing device; and a conversion lens that receives the light beam emerged from the objective optical system of the optical data recording/reproducing device and emerges the light beam, all of which enters the objective optical system of the interferometer.

Optionally, the conversion lens is a hemispherical lens, a point where the light beam emerged from the objective optical system of the optical data recording/reproducing system converges substantially coincides with the spherical center of the hemispherical lens.

DESCRIPTION OF THE EMBODIMENTS

Figure 1:
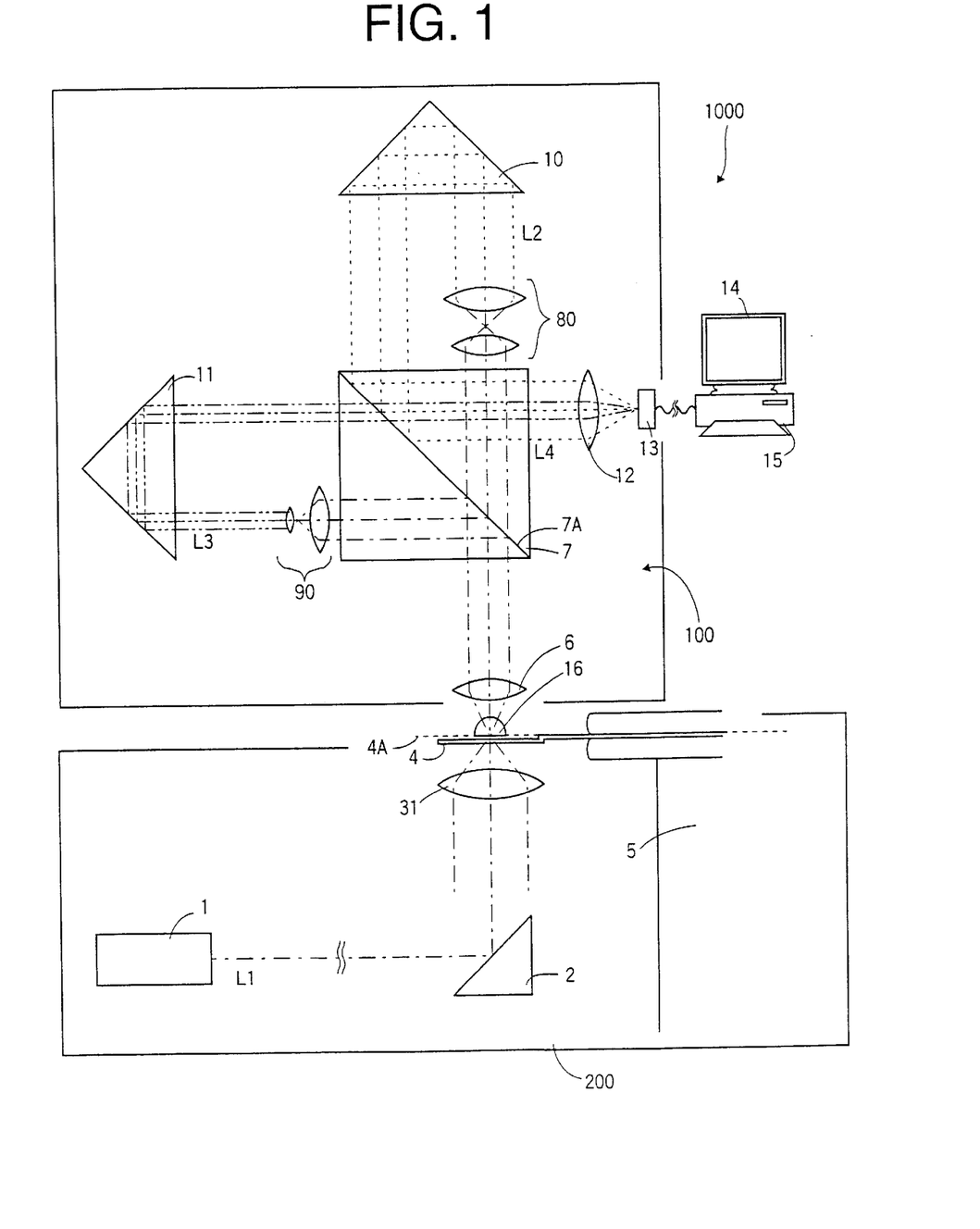
FIG. 1 shows an arrangement of optical elements of a lens inspection system according to a first embodiment.

FIG. 1 shows a basic arrangement of optical elements of a lens inspection system 1000 according to a first embodiment of the Invention. The lens inspection system 1000 is used for measuring a wave front of light emerged from an objective lens 31 of an optical disc drive 200 to examine an optical performance of the lens 31.

The lens inspection system 1000 is provided with a laser source 1, a mirror 2, a dummy disc 4, a display 14, a personal computer 15, and a lens inspection device that includes a hemispherical lens 16 which function as a converting lens, and an interferometer 100.

The dummy disc 4 is mounted, instead of an optical disc, on a spindle 5 of the optical disc drive 200 when the inspection of the lens 31 is performed. Specifically, the dummy disc 4 is a disc-shaped parallel plate, which is transparent and having a thickness and refractive index that are similar to those of a transparent base plate of the optical disc. It should be noted that the laser source 1, the mirror 2 and the spindle 5 are part of the optical disc drive 200, and also used for recording and reproducing data.

When data is recorded/reproduced, a laser beam L1 which is emitted by the laser source 1 proceeds, by way of the mirror 2, toward an objective lens 31 to be inspected. The laser beam L1 is then converged on the data recording surface of the optical disc that is mounted on the spindle 5. When the lens 31 is inspected, the beam emerged from the objective lens 31 is transmitted through the dummy disc 4 and the hemispherical lens 16, and impinges on an interferometer 100. Since, as described above, the same light source is used for recording/reproducing of data and inspection of the lens 31, the lens inspection system 1000 can be made compact in size, and the structure thereof may be simplified. It should be noted that the objective lens 31 to be inspected is a high-NA lens (e.g., NA=0.9).

The interferometer 100 includes an objective lens 6, a beam splitter 7 which splits a beam from the objective lens 6, a magnifying optical system 80 which magnifies a cross section of a beam split by the beam splitter 7, a reducing optical system 90 which reduces across section of an incident beam, right angle prisms 10 and 11, an imaging lens 12, and a CCD (Charge Coupled Device) 13. The numerical aperture of the objective lens 6 is smaller (e.g., NA=0.6) than that of the objective lens 31.

The hemispherical lens 16 has a first surface 16A, which is a hemispherical surface, and a second surface 16B, which is a flat surface. In the first embodiment, the hemispherical lens 16 is arranged such that the first surface 16A faces the objective lens 6, and the center of the curvature of the spherical surface (which will be referred to as a spherical center, hereinafter) coincides with the focal point of the objective lens 6. The beam emerged from the objective lens 31 converges on the spherical center of the hemispherical lens 16. With this arrangement, the beam passed through the objective lens 31 converges at the spherical center of the hemispherical lens 16, and proceeds in the hemispherical lens 16 toward the objective lens 6 without being refracted when emerged from the first surface 16A. Therefore, the beam passed through the objective lens 6 becomes a parallel light beam.

Further, in the first embodiment, the second surface 16B is located at the same position as the data recording surface of the optical disc. Thus, the condition of the wave front detected by the interferometer is substantially the same as the actual condition on the data recording surface of the optical disc. In this case, a surface of the dummy disc 4 facing the hemispherical lens 16 is shifted toward the objective lens 31 so that the second surface 16B does not contact the dummy disc 4. Since the hemispherical lens 16 does not contact the dummy disc 4, scratches or breakage of the hemispherical lens 16 and/or the dummy disc 4 are prevented.

When a lens is examined, the interferometer 100 is coupled to the optical data recording/reproducing device 200, and the optical axis of the lens 31 is made coincide with the optical axis of the interferometer 100 using a tracking mechanism of the device 200. Then, by making use of a focusing mechanism, the position, along the optical axis thereof, of the lens 31 is adjusted so that the beam emerged from the lens 31 converges at the spherical center of the hemispherical lens 16 via the dummy disc 4. The laser beam L1 is refracted when passing through the dummy disc 4. Since the dummy disc 4 is a parallel plate, the incident angle of the beam L1 with respect to the dummy disc 4 is the same as the incident angle to the hemispherical lens 16.

The laser beam L1 converged at the spherical center of the hemispherical lens 16 is refracted by the second surface 16B and impinges the hemispherical lens 16. Since the laser beam L1 converges at the center of the hemispherical lens 16, when the beam emerges from the first surface 16A to the air, the beam is not refracted and proceeds in radial directions.

Figure 2:
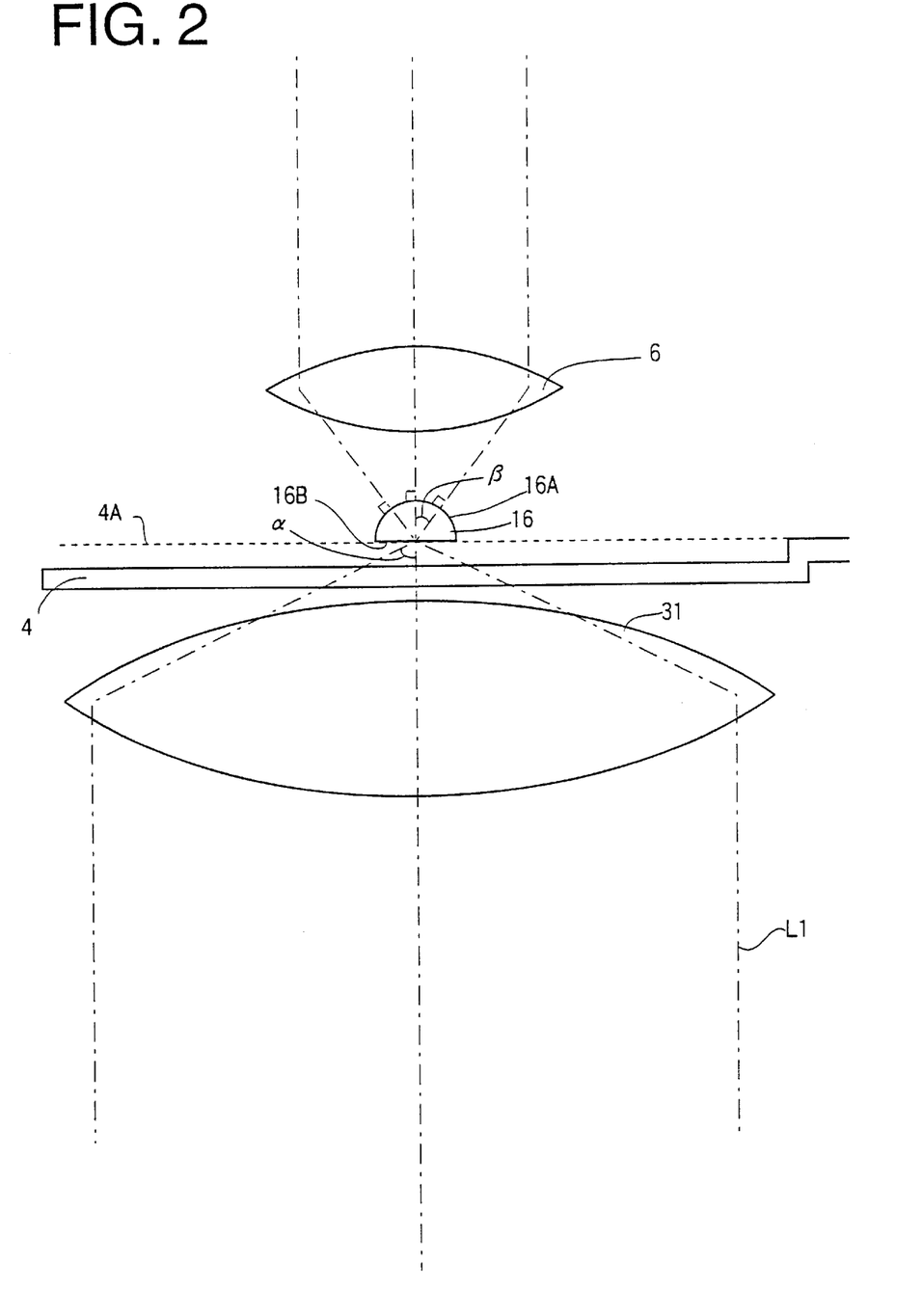
FIG. 2 is an enlarged view of a hemispherical lens of the lens inspection system according to the first embodiment.

FIG. 2 is an enlarged view of the lens 31, the dummy disc 4, the hemispherical lens 16, and the objective lens 6. The numerical apertures of the lens 31 and the lens 6 will be represented by $NA_{31}$ and $NA_6$, respectively. In this system, condition (1) below is satisfied.

$$n_0 \cdot \sin \alpha = n_{16} \cdot \sin \beta \qquad (1)$$

where, $n_0$ denotes the refractive index of the air, $n_{16}$ is the refractive index of the hemispherical lens 16, $\alpha$ denotes the maximum incident angle, with respect to the hemispherical lens 16, of the light beam converging on the spherical center of the hemispherical lens 16, and $\beta$ denotes a refraction angle thereof.

Since $n_0=1$, equation (1) is expressed as equation (2).

$$\sin \beta = \sin \alpha / n_{16} \qquad (2)$$

From the definition of the numerical aperture, $\sin \alpha = NA_{31}$ and $\sin \beta = NA_6$, and therefore, equation (2) can be rewritten into equation (3) below.

$$NA_6 = NA_{31}/n_{16} \qquad (3)$$

It should be noted that, in general, $n_{16}>1$, and therefore, $NA_6 < NA_{31}$.

Therefore, if the numerical aperture $NA_6$ of the objective lens 6 and the numerical aperture $NA_{31}$ of the lens 31 are known, by using the hemispherical lens 16 whose refractive index satisfies the equation (3), the wave front of the light beam emitted from the lens 31 can be measured with the objective lens 6 whose numerical aperture $NA_6$ is smaller than the numerical aperture $NA_3$ of the lens 31. It should be noted that if the numerical aperture of the objective lens 6 is equal to or greater than the numerical aperture $NA_6$ satisfying the equation (3), the wave front of the light beam emerged from the lens 31 can be measured.

Therefore, in order to measure the wave front of the beam emitted from the lens 31 whose numerical aperture is $NA_{31}$ with the objective lens whose numerical aperture is $NA_6$, the refractive index $n_{16}$ of the hemispherical lens 16 should satisfy the equation (4) below.

$$n_{16} \geq NA_{31}/NA_6 \tag{4}$$

For example, when the numerical aperture $NA_{31}$ of the lens 31 is 0.9, and the numerical aperture $NA_6$ of the objective lens is 0.6, the wave front can be measured by employing the hemispherical lens made of material, e.g., glass or synthetic resin, whose refractive index is equal to or greater than 1.5.

The laser beam L1 incident on the objective lens 6 is directed to the beam splitter 7 as a parallel beam. The laser beam L1 is then divided into a beam proceeding toward the rectangular prism 10 and a beam proceeding toward a rectangular prism 11 by a half mirror surface 7A of a beam splitter 7.

The beam proceeding to the rectangular prism 10 passes through an enlarging optical system 80, with which a diameter of the cross section of the beam is enlarged, then is incident on the rectangular prism 10 as a beam L2. The beam L2 is reflected twice (180 degrees) by the rectangular prism 10, and then is incident on the beam splitter 7 again.

A central portion of a cross section of the beam L1 passed through the lens 31 includes less aberration than the peripheral portion thereof. Thus, the central portion of the cross section of the beam L1 is enlarged and used as a reference light of the interferometer 100.

The beam directed to the rectangular prism 11 passes through a reducing optical system 90, with which a diameter of the cross section of the beam is reduced, then is incident on the rectangular prism 11 as a beam L3. The beam L3 is reflected twice (180 degrees) by the rectangular prism 11, and is incident on the beam splitter 7 again. The cross section of the beam L3 is reduced so that it is substantially the same size as the central portion of the beam L1. It should be noted that, on the half mirror surface 7A, the central ray of the beam L2 and the central ray of the beam L3 substantially coincide with each other.

As above, the beams L2 and L3 are combined by the half mirror 7A of the beam splitter 7, and then the synthesized beam L4 is incident on a CCD (Charge Coupled Device) 13 through the imaging lens 12 to form interference infringes on the light receiving surface of the CCD 13. A personal computer 15 for analyzing the interference infringes represented by the image signal output by the CCD 13, and displays the image thereof on a display 14. The personal computer 15 also analyzes the image of the interference infringes and evaluates the lens 31.

In the above-described first embodiment, the dummy disc 4 is formed to have a particular shape so as to avoid collision between the hemispherical lens 16 and the dummy disc 4. However, the shape of the dummy disc should not be limited to the shape shown in FIG. 2.

For example, the shape of the dummy disc 4 may be the same as the normal optical disc. In this case, the hemispherical lens 16 and the dummy disc 4 may be apart from each other by some tens of micro millimeters. For this purpose, the dummy disc 4 may be arranged to be shifted towards the lens 31 with respect to the position of the optical disc 4 for the recording/reproducing operation.

Alternatively, the hemispherical lens 16 may be arranged to contact the dummy disc 4. In such a case, the hemispherical lens 16 may be formed integrally on the dummy disc 4.

Further alternatively, a parallel plate may be used instead of the dummy disc 4. In this case, the parallel plate may have the same thickness and refractive index as the transparent base plate of the optical disc, and the beam emitted from the lens 31 is transmitted through the parallel plate. In this case, the hemispherical lens may be arranged to or not to contact the parallel plate. Further, if the hemispherical lens contacts the parallel plate, they may be integrally formed. Further, in this case, it should be stressed that the size of the parallel plate need not be as large as the dummy disc 4. The size of the parallel plate is sufficient if the light emerged from the lens 31 is directed to the hemispherical lens 16.

Figure 5:
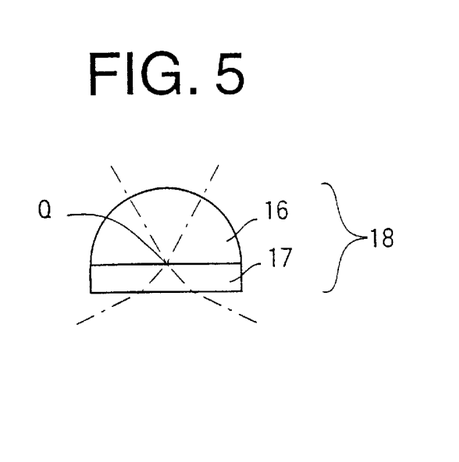
FIG. 5 is a converting lens according to a modification of the invention.
Figure 6:
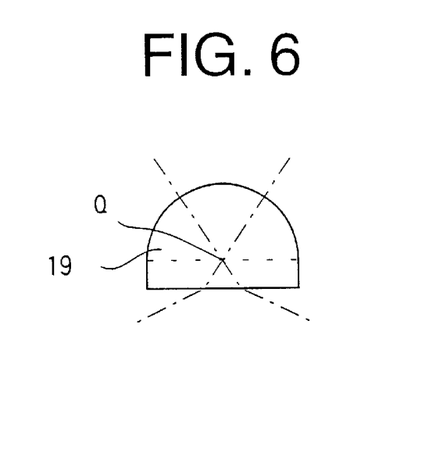
FIG. 6 shows a converting lens according to another modification of the invention.

In FIG. 5, a hemispherical lens 16 contacts a parallel plate 17, and in FIG. 6, they are formed integrally.

In the case of FIG. 5 or FIG. 6, the light emitted from the lens 31 converges at the spherical center Q of the hemispherical lens 16, is refracted when proceeds from the parallel plate to the hemispherical lens, proceeds within the hemispherical lens, and then emerged from the spherical surface of the lens 16 without being refracted thereat since the light proceeds in the radial direction.

Figure 7:
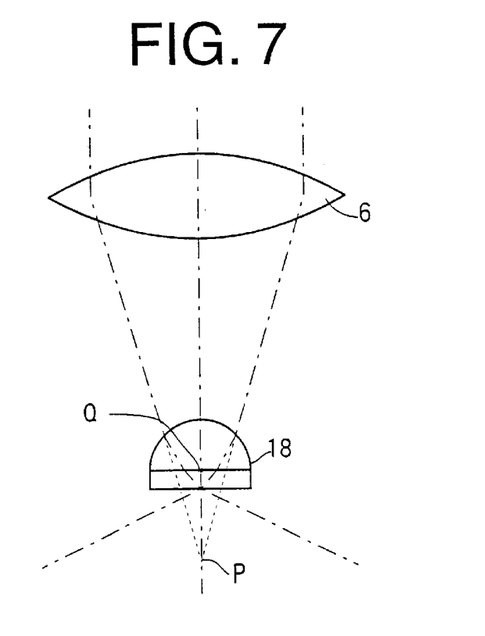
FIG. 7 shows a converting lens according to a further modification of the invention.
Figure 8:
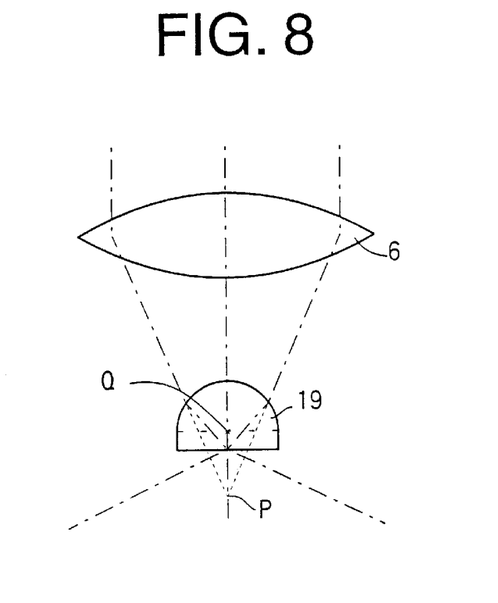
FIG. 8 shows a converting lens according to a still further modification of the invention.

As above, the conversion lens 18 or 19 is capable of converting the beam emitted from the lens 31 to a beam which can impinges in the objective lens 6, and therefore it becomes possible to examine the wave front with the interferometer 100 employing the objective lens 6 whose numerical aperture is not so large.

It should be noted that the spherical center Q of the hemispherical lens can be located on a downstream side with respect to a portion at which the beam converges as far as it is located on the central axis of the beam and in the vicinity of the converging position. Further, the converging position may be located at a position which coincides with the spherical center Q, or on the lens 31 side thereof, and at which the all the beam is emerged from the curved surface of the conversion lens.

Therefore, as shown in FIGS. 7 and 8, the beam conversion lens 18 or 19 enables the examination of the wave front of the beam emerged from the lens 31 even when the beam is converged on the center of the flat surface but not the spherical center Q of the curved surface.

In this case, the objective lens 6 is to be arranged such that a focal point of the objective lens coincides with a point P at which extended lines of the outmost rays of a beam emerged from the conversion lens 18 or 19 intersects. With this arrangement, the beam impinges on the conversion lens 18 or 19 is emitted therefrom as a parallel beam (see FIGS. 7 and 8).

It is also possible to inspect the lens 31 with only the hemispherical lens 16 without using the parallel plate and the dummy disc. In this case, although the preciseness of the reproductivity of the wave front with respect to the case where the data is recorded is lowered, the positional adjustment of the parallel plate and the lenses can be omitted, and therefore inspection of the lens can be done quicker.

In the above-described embodiment, the hemispherical lens 16 is used as the light beam conversion lens. However, the invention is not limited to the lens of the above-described shape. Any lens which is capable of receiving the light beam emitted by the lens 31 and emerges the light beam which can be incident on the objective lens 6 of the interferometer can be used as the light beam conversion lens. For example, the lens 20 shown in FIG. 9, which is not a hemispherical lens, can be used. The lens 20 has a shape which is a part of a sphere cut by a plane.

Figure 9:
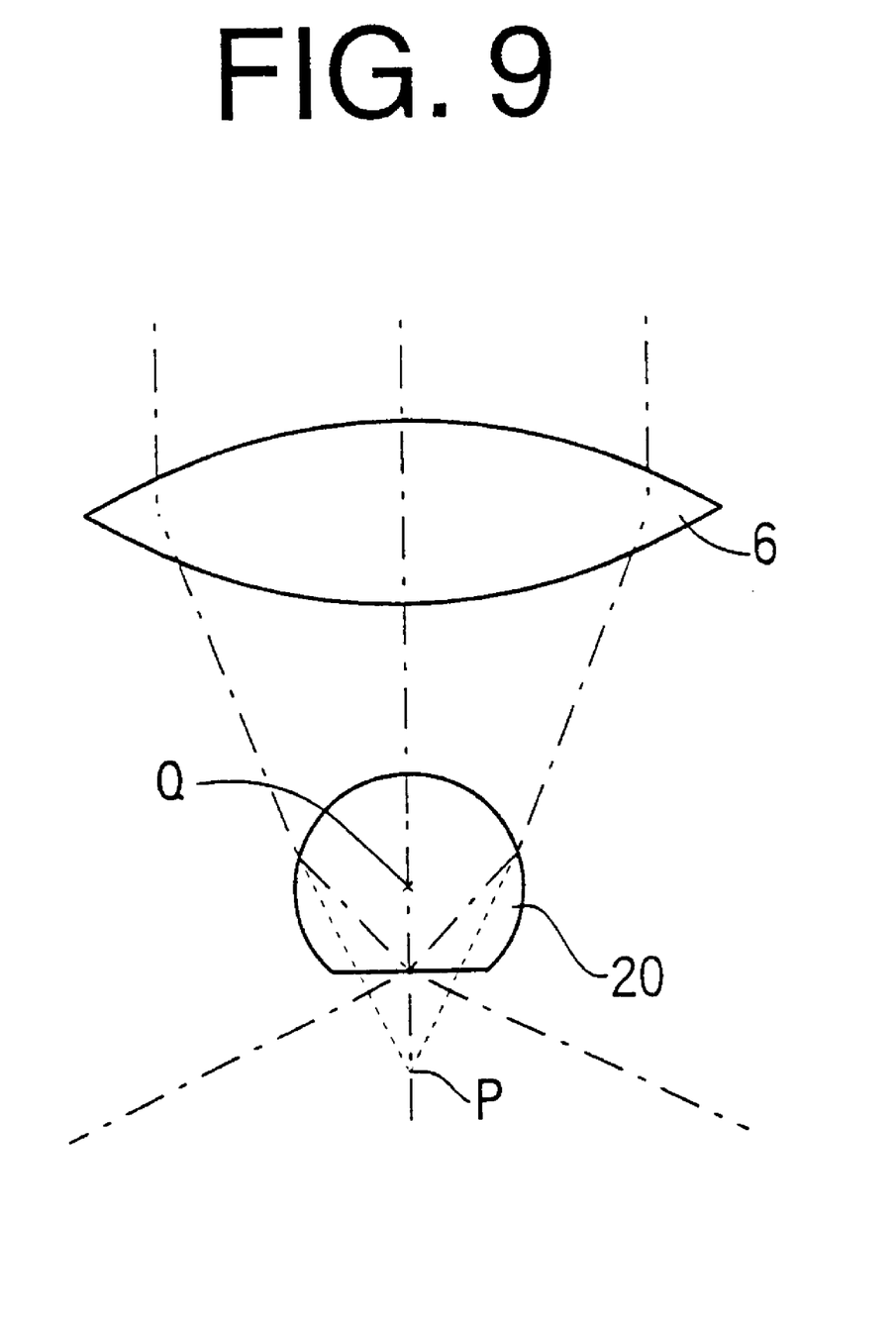
FIG. 9 shows a converting lens according to another modification of the invention.

In FIG. 9, the lens 20 is located at a position where the light beam converges at the center of a flat surface. However, similarly to the location of the lens 18 or 19, the lens 20 can be located another position, for example, at a position where the lens 31 converges the light beam at the center Q of the spherical surface.

Next, as a second embodiment, a lens inspection system which is capable of inspecting a lens whose NA is greater than one (1). As an objective lens system whose NA is greater than one, a system employing a solid immersion lens (SIL) has been known. The solid immersion lens (SIL) has been used, for example, in an optical disc drive adopting a recoding/reproducing system in accordance with a near field recording (NFR) technology.

In the conventional interferometer, inspection of such an objective lens, whose numerical aperture is greater than one, cannot be performed.

Figure 3:
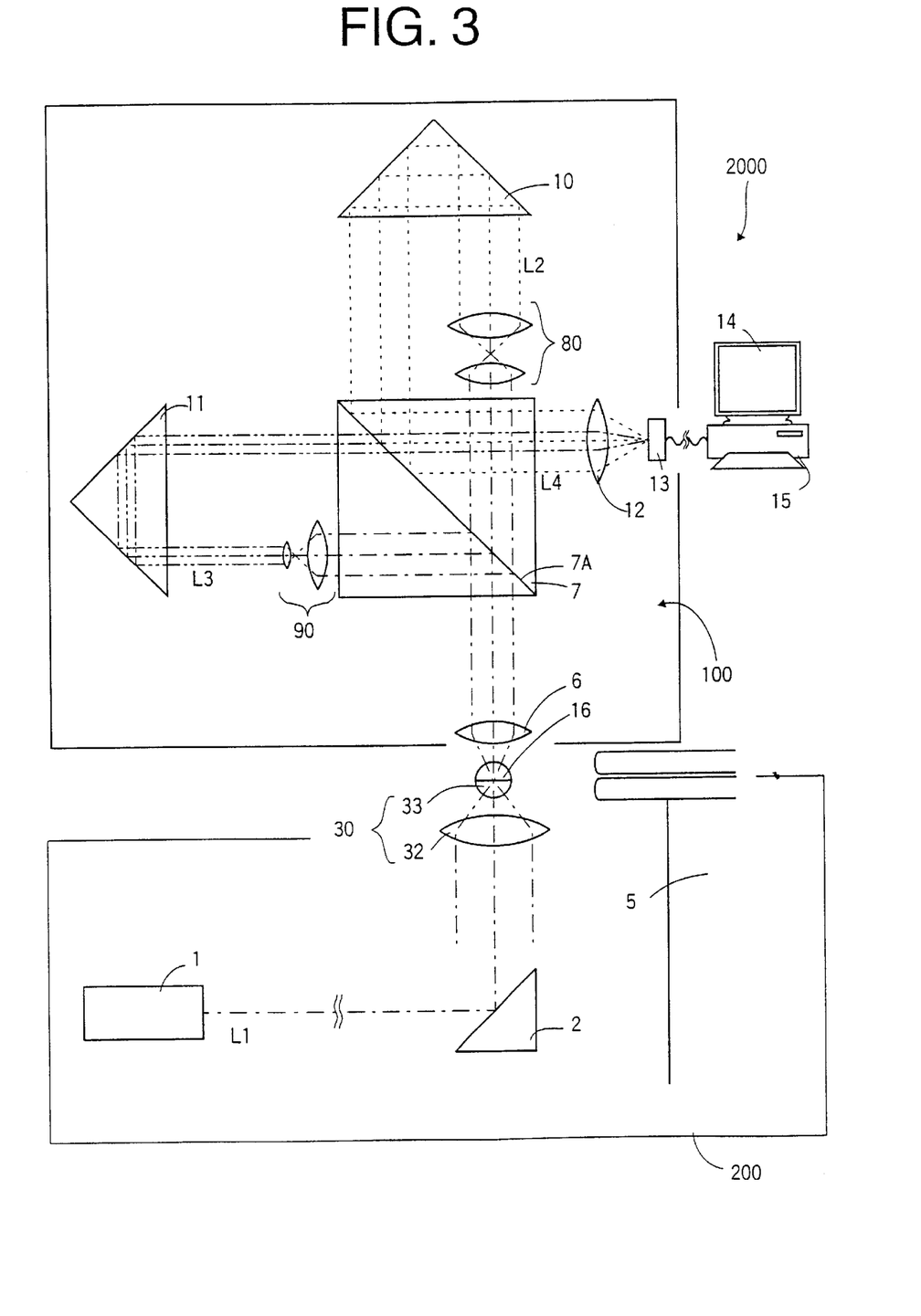
FIG. 3 shows an arrangement of optical elements of a lens inspection system according to a second embodiment.
Figure 4:
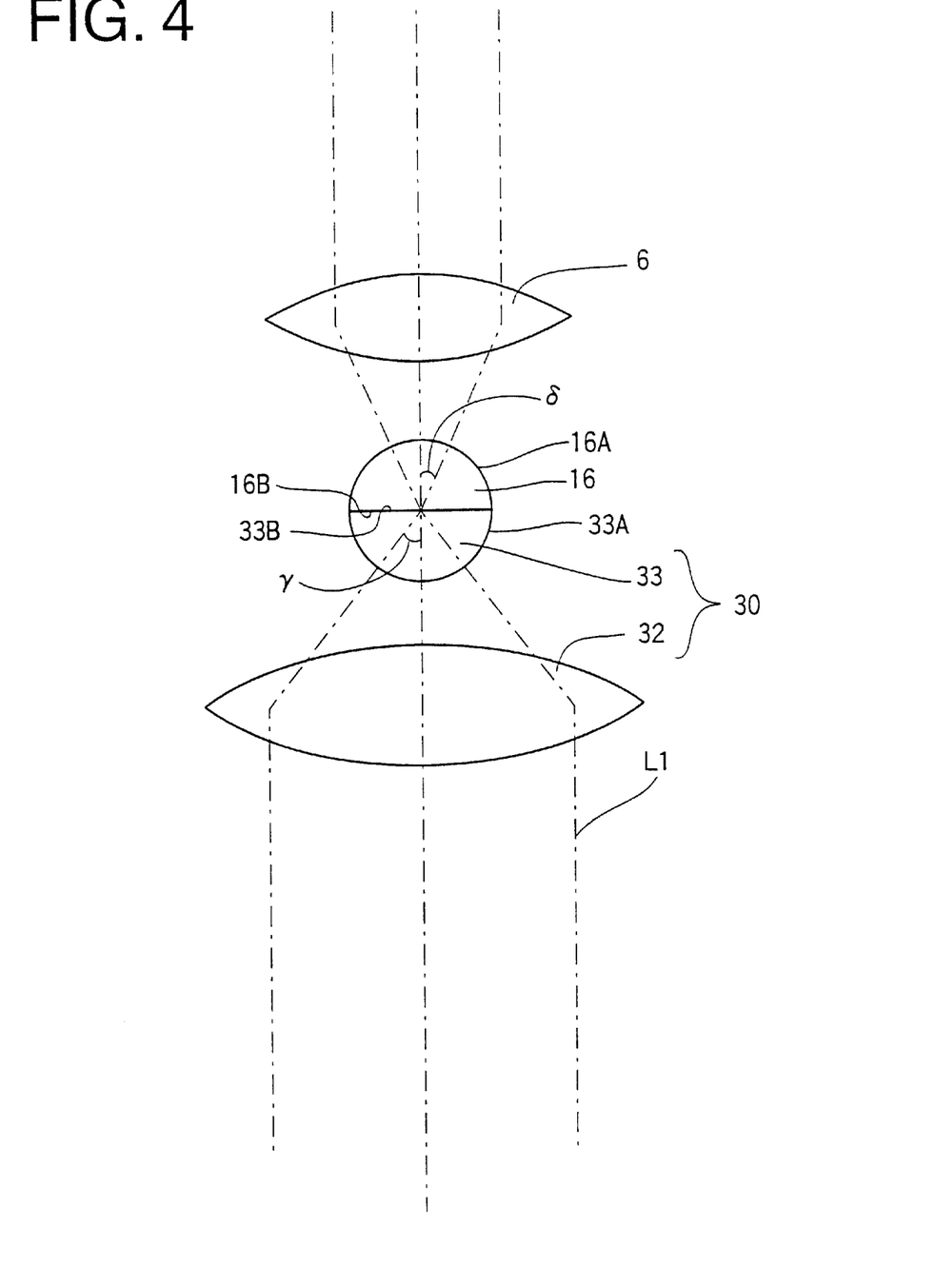
FIG. 4 is an enlarged view of a hemispherical lens of the lens inspection system according to the second embodiment.

FIG. 3 shows a basic arrangement of the optical elements of a lens inspection system 2000 according to a second embodiment. As shown in FIG. 3, in an optical data reproducing/recording device, an objective optical system 30 includes an objective lens 32 and an SIL 33. The SIL 33 has a spherical surface 33A (see FIG. 4) and a flat surface 33B on which a spherical center of the spherical surface 33A is located. As shown in FIG. 4, the SIL 33 is arranged such that the spherical surface 33A faces the objective lens 32, and that the spherical center of the spherical surface 33A coincides with the focal point of the objective lens 32. The arrangement of the other elements is substantially similar to those in the first embodiment, and the description thereof will be omitted.

In the second embodiment, the dummy disc is not used. When the inspection is performed, the flat surfaces of the hemispherical lens 16 and the SIL 33 contact with each other such that the spherical center of the hemispherical lens 16 and the spherical center of the SIL 33 coincide with each other.

The laser beam L1 emitted by the laser source 1 is directed to, by the mirror 2, the objective lens 32. The laser beam L1 is converged by the objective lens 32 and is directed to the SIL 33. Since the focal point of the objective lens 32 coincides with the spherical center of the SIL 33, the converged beam L1 is not refracted by the spherical surface 33A.

When data is recorded/reproduced, the flat surface 33B of the SIL 33 is exposed to the air, and therefore the optical system 30 has an NA greater than 1. Therefore, the light incident on the flat surface 33B of the SIL 33 from inside is totally reflected at a boundary between the air and the flat surface 33B of the SIL 33, and the laser beam L1 is not emerged as it is. Instead, an evanescent light is emerged in the vicinity of the spherical center of the SIL 33. When the data is recorded/reproduced, the evanescent light impinges the data recording surface of the optical disc mounted onto the spindle 5.

In the second embodiment, the SIL 33 and the hemispherical lens 16 are arranged such that the spherical centers thereof coincide with each other. Therefore, the laser beam L1 is not totally reflected by the flat surface 33B of the SIL 33, and enters the hemispherical lens 16. The laser beam passed through the spherical center of the hemispherical lens 16 is emerged from the spherical surface of the hemispherical lens 16 without being refracted, and is incident on the objective lens 6 of the interferometer.

The second embodiment will be described in detail hereinafter with reference to FIG. 4.

FIG. 4 is an enlarged view showing the objective optical system 30 including the objective lens 32 and the SIL 33, the hemispherical lens 16, and the objective lens 6 of the interferometer. In this optical system, condition (5) is satisfied.

$$n_{33} \cdot \sin \gamma = n_{16} \cdot \sin \delta \quad (5)$$

where, $n_{33}$ denotes the refractive index of the SIL 33, $n_{16}$ denotes the refractive index of the hemispherical lens 16, $\gamma$ denotes an incident angle of the outmost ray of the beam L1 incident on the flat surface 33B, and $\delta$ denotes a refraction angle of the outmost ray of the refracted beam entering from the SIL 33 to the hemispherical lens 16.

Since $\sin \gamma = NA_{32}$ ($NA_{32}$ being the numerical aperture of the objective lens 32), from condition (5), condition (6) is obtained.

$$\sin \delta = n_{33} \cdot NA_{32}/n_{16} \quad (6)$$

In condition (6), $n_{33} \cdot NA_{32}$ can be regarded as $NA_{30}$, and $\sin \delta = NA_6$, condition (6) can be expressed by equation (7) below.

$$NA_6 = NA_{30}/n_{16} \quad (7)$$

Thus, when the numerical aperture of the objective lens 6 of the interferometer and that of the optical system 30 to be inspected area known, by using the hemispherical lens 16 whose refractive index satisfies condition (7), it becomes possible to measure the wave front with the interferometer having the objective lens 6 whose numerical aperture is smaller than one (1). It should be noted that the numerical aperture of the objective lens 6 may be greater than $NA_6$ satisfying condition (7). Therefore, in order to measure the wave front of the light beam emerged from the optical system 30, whose numerical aperture is $NA_{30}$, using the objective lens 6, whose numerical aperture $NA_6$, the refractive index $n_{16}$ of the hemispherical lens 16 should satisfy the relationship (8) below.

$$n_{16} \geq NA_{30}/NA_6 \quad (8)$$

The inspection procedure is similar to that of the first embodiment, and therefore, the description thereof will be omitted.

In the second embodiment, in order to inspect the optical system whose numerical aperture is greater than one, the hemispherical lens is arranged to contact thereto. It should be noted that, even though the numerical aperture of the optical system to be inspected is not greater than one, inspection can be performed with the hemispherical lens being contacted with the optical system to be inspected.

In FIG. 3, the SIL and the hemispherical lens are drawn as approximately the same size. The size of the lenses is not limited to the drawn size, and can vary respectively. What is important is the spherical centers of the SIL and the hemispherical lens substantially coincide.

Further, similarly to the modifications of the first embodiment, the hemispherical lens can be replaced with the lens 19 shown in FIG. 8 or the lens 20 shown in FIG. 9.

In the embodiments, as an interferometer, a radial sharing interferometer is used. However, the invention is not limited to the usage of such an interferometer, and a lateral sharing interferometer, a rotational sharing interferometer or the like can replace the radial sharing interferometer.

As described above, by employing the beam conversion lens, the wave front of the light beam emerged from the optical system having a greater numerical aperture can be measured with an interferometer having an objective lens whose numerical aperture is relatively small. In particular, even if the numerical aperture of the optical system is greater than one, the inspection becomes possible.

The present disclosure relates to the subject matter contained in Japanese Patent Application No. HEI11-075030, filed on Mar. 19, 1999, which is expressly incorporated herein by reference in its entirety.

What is claimed is:

1. A lens inspection system for evaluating an objective optical system of an optical data recording/reproducing device by measuring a wave front of a light beam emerged from the objective optical system, comprising:
   a laser source, a laser beam emitted by the laser source being incident on the objective optical system of said optical data recording/reproducing device;
   an interferometer for measuring the wave front, a numerical aperture of an objective lens of said interferometer being smaller than a numerical aperture of the objective optical system of said optical data recording/reproducing device; and
   a conversion lens which receives the light beam emerged from the objective optical system of said optical data recording/reproducing device and emerges a light beam to the objective lens of said interferometer such that all the light beam emerged from said conversion lens enters the objective lens of said interferometer.

2. The lens inspection system according to claim 1, wherein said conversion lens has a first surface including a spherical surface, and a second surface that is a flat surface perpendicular to a central axis of the light beam emerged from the objective optical system of said optical data recording/reproducing device, said first surface facing the objective lens of said interferometer, said second surface facing the objective optical system of said optical data recording/reproducing device, said central axis of the light beam passes a spherical center of said first surface.

3. The lens inspection system according to claim 2, wherein a parallel plate is inserted between the objective optical system of said optical data recording/reproducing device and said conversion lens, said parallel plate having a thickness and refractive index that are similar to those of a transparent base plate of an optical disc, data being reproduced/recorded on said optical disc using said optical data recording/reproducing device.

4. The lens inspection system according to claim 3, wherein said conversion lens and said parallel plate are apart from each other.

5. The lens inspection system according to claim 4, wherein said parallel plate is a dummy disc that is mounted on a spindle of a data recording/reproducing device.

6. The lens inspection system according to claim 5, wherein said second surface of said conversion lens is located at a level where the data recording surface of said optical disc is located when data is recorded/reproduced, and at least a portion of said dummy disc facing said conversion lens is shifted toward the objective optical system side.

7. The lens inspection system according to claim 3, wherein said conversion lens contacts said parallel plate.

8. The lens inspection system according to claim 7, wherein said conversion lens and said parallel plate are integrally formed.

9. The lens inspection system according to claim 1, wherein said conversion lens is made contact with a surface of said objective optical system of said optical data recording/reproducing device.

10. The lens inspection system according to claim 9, wherein a numerical aperture of said objective optical system of said optical data recording/reproducing device is greater than one.

11. The lens inspection system according to claim 1, wherein said conversion lens is a hemispherical lens.

12. The lens inspection system according to claim 11, wherein a point where the light beam emerged from said objective optical system of said optical data recording/reproducing system converges substantially coincides with the spherical center of said hemispherical lens.

13. The lens inspection system according to claim 4, wherein said conversion lens is a hemispherical lens.

14. The lens inspection system according to claim 13, wherein a point where the light beam emerged from said objective optical system of said optical data recording/reproducing system converges substantially coincides with the spherical center of said hemispherical lens.

15. The lens inspection system according to claim 7, wherein said conversion lens is a hemispherical lens.

16. The lens inspection system according to claim 15, wherein a point where the light beam emerged from said objective optical system of said optical data recording/reproducing system converges substantially coincides with the spherical center of said hemispherical lens.

17. The lens inspection system according to claim 9, wherein said conversion lens is a hemispherical lens.

18. The lens inspection system according to claim 17, wherein a point where the light beam emerged from said objective optical system of said optical data recording/reproducing system converges substantially coincides with the spherical center of said hemispherical lens.

19. A lens inspection system for measuring a wave front of a light beam emerged by an objective optical system of an optical data recording/reproducing device, comprising:
    an interferometer for measuring the wave front, a numerical aperture of an objective optical system of said interferometer being smaller than a numerical aperture of the objective optical system of said optical data recording/reproducing device; and
    a conversion lens that receives the light beam emerged from the objective optical system of said optical data recording/reproducing device and emerges the light beam, all of which enters the objective optical system of said interferometer.

20. The lens inspection system according to claim 19, wherein said conversion lens is a hemispherical lens, a point where the light beam emerged from the objective optical system of said optical data recording/reproducing system converges substantially coincides with the spherical center of said hemispherical lens.

* * * * *